Aug. 29, 1939.   J. W. TURRENTINE   2,170,843
METHOD OF MAKING CALCIUM PHOSPHATE PRODUCTS
Filed Sept. 23, 1936
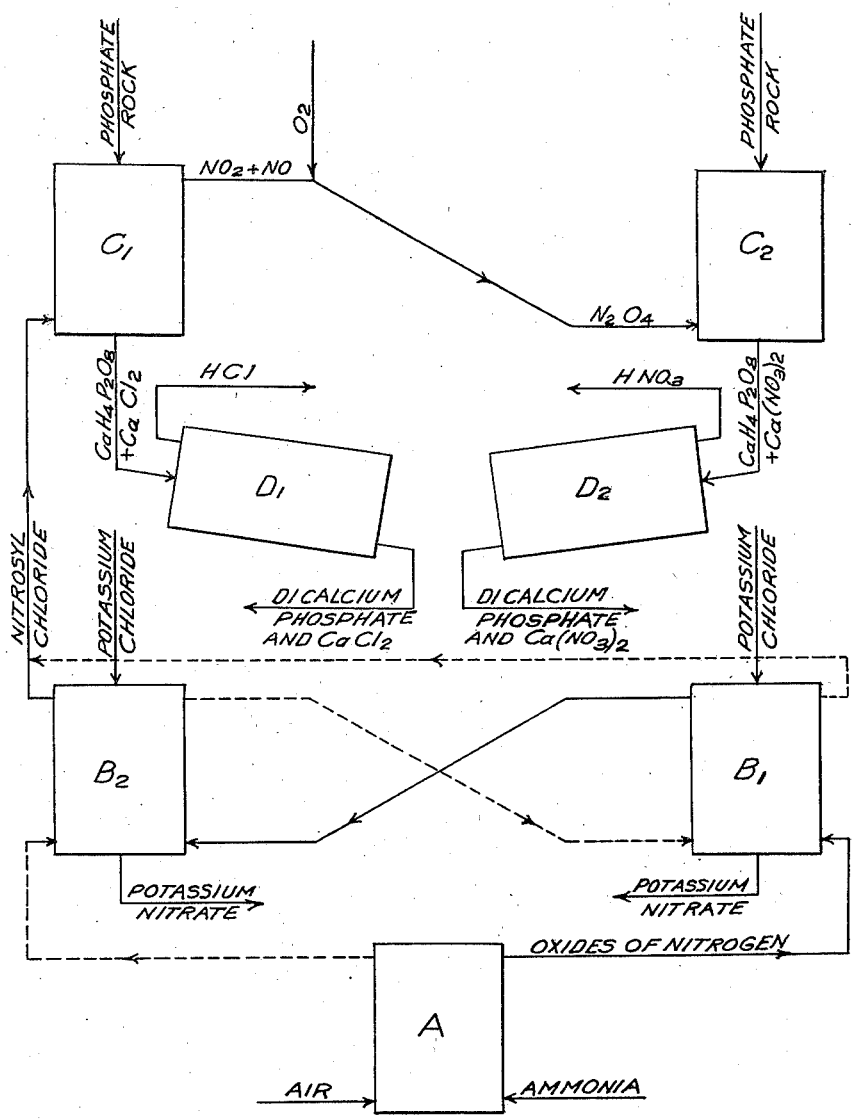
INVENTOR.
John W. Turrentine,
BY
ATTORNEYS.

Patented Aug. 29, 1939

2,170,843

UNITED STATES PATENT OFFICE 2,170,843

METHOD OF MAKING CALCIUM PHOSPHATE PRODUCTS

John W. Turrentine, Washington, D. C.

Application September 23, 1936, Serial No. 102,196

8 Claims. (Cl. 71—38)

This invention relates to the conversion of phosphate rock into agriculturally available form by reaction with gases containing nitrogen oxides and chlorine, especially nitrosyl chloride, and is particularly directed to a method whereby ferilizer raw materials such as phosphate rock, potassium chloride and nitrogen oxides from the oxidation of ammonia, may be converted into agriculturally available or otherwise more merchantable forms.

I have found that when nitrosyl chloride is brought into reactive contact with phosphate rock in the presence of water, a reaction occurs resulting in the formation of acid phosphates or phosphoric acid and calcium chloride and nitrate, and that the resulting product, when heated as described in my application Serial No. 5881 filed February 9, 1935, now Patent 2,134,013, liberates at least a portion of the reacted acids as nitric and hydrochloric acids leaving a calcium phosphate product of high agricultural availability and containing calcium and phosphate radicals in substantially the proportion of dicalcium phosphate, when the calcium combined with the residual chloride and nitrate is taken into account.

The method may be operated in such a way as to convert the nitrosyl chloride in one operation entirely into a mixed product containing both calcium chloride and calcium nitrate, particularly if a supply of oxygen is made available to the reactants. It is generally preferable, however, to effect the absorption of the nitrosyl chloride in two stages, the first giving a phosphate product containing calcium chloride and a gaseous product containing nitrogen oxides and thereafter reacting the nitrogen oxides with a further quantity of phosphate rock in the presence of oxygen or after the addition of oxygen to the gases to produce a phosphate product containing calcium nitrate.

While the use of nitrosyl chloride from any source is contemplated, I prefer to use that obtained in the reaction between nitrogen peroxide and an alkali metal chloride, and particularly to the gaseous products resulting from the conversion of potassium chloride into potassium nitrate by the reaction of nitrogen peroxide, preferably in the form of gases containing oxides of nitrogen obtained by the oxidation of ammonia in air or oxygen, with moist potassium chloride, whereby a solid potassium nitrate product and a gaseous product containing substantial amounts of nitrosyl chloride, with or without hydrogen chloride or nitrogen oxides or both, are formed.

For example, the oxidation products of ammonia, using air as a source of oxygen contain 8 to 10% of $NO_2$, the balance being principally nitrogen, with or without an excess of oxygen and water vapor. When this mixture of gases is passed in reactive contact with crystalline potassium potassium chloride, the latter is substantially quantitatively converted into potassium nitrate and the chlorine content of the salt is practically quantitatively converted into nitrosyl chloride.

This invention provides a method for the satisfactory commercial utilization of nitrosyl chloride which has heretofore failed of solution. It further provides a solution of the economic production of potassium nitrate by the action of nitrogen peroxide on crystalline potassium chloride, a manufacture heretofore commercially non-feasible because of the losses of nitrogen represented by the formation of nitrosyl chloride. By this invention this manufacture may now be carried on and all the nitrogen employed in the process recovered as nitrogen oxides and applied as such or as desired, through recycling or otherwise, or converted into nitric acid or its derivatives; likewise the chlorine constituent of the potassium chloride is quantitatively utilized in useful manufacture.

The reactions involved in the practice of this invention are illustrated by the following equations:

1. $N_2O_4 + KCl = KNO_3 + NOCl$

2. $10NOCl + 2(CaO)_{3.5}.P_2O_5 + 4H_2O =$
   $2CaH_4P_2O_8 + 5CaCl_2 + 5NO_2 + 5NO$

3. $14NOCl + 2(CaO)_{3.5}.P_2O_5 + 6H_2O =$
   $4H_3PO_4 + 7CaCl_2 + 7NO_2 + 7NO$

4. $10H_3PO_4 + 2(CaO)_{3.5}.P_2O_5 = 7CaH_4P_2O_8 + H_2O$

5. $NO_2 + NO + O = N_2O_4$

6. $5N_2O_4 + 2(CaO)_{3.5}.P_2O_5 + 4H_2O =$
   $2CaH_4P_2O_8 + 5Ca(NO_3)_2$

7. $7N_2O_4 + 2(CaO)_{3.5}.P_2O_5 + 6H_2O =$
   $4H_3PO_4 + 7Ca(NO_3)_2$

8. $CaCl_2 + CaH_4P_2O_8 = 2HCl + 2CaHPO_4$

9. $Ca(NO_3)_2 + CaH_4P_2O_8 = 2HNO_3 + 2CaHPO_4$ (The expression $(CaO)_{3.5}.P_2O_5$, in the foregoing equations represents phosphate rock and the ratio of base to acid commonly found therein.)

The proportions of the several reactants herein involved, it is obvious, are determined by the requirements of the basic reactions involved.

Thus the proportion of nitrogen peroxide in the oxidation products of ammonia are fixed by technology, depending on whether air is used as a source of oxygen or pure oxygen is employed in that oxidation. The application of this gas mixture to potassium chloride, if a quantitative yield of potassium nitrate is to be obtained, is likewise fixed by the stoichiometric requirements of the reaction; and in a countercurrent system, if such be employed, it is obvious that any ratio of reactants is permissible provided the rate of flow of solids against gases, that is, the time of contact between gases and solids, is properly regulated. Likewise the ratio of nitrosyl chloride gases to phosphate rock is similarly predetermined by the requirements of the reaction, particularly so if the complete conversion of the phosphate rock to calcium chloride and phosphoric acid is to be effected. The same applies also to the reaction of the residual oxides of nitrogen upon phosphate rock for the absorption thereof. Accordingly, delineations of exact proportion of reactants would be superfluous as such would be obvious to one versed in the art, and are therefore omitted.

As a source of water, in reacting potassium chloride with nitrogen oxides, I may add water up to 20% by weight to the potassium chloride crystals or I may rely, in part at least, on the water vapor present in the oxidation products of ammonia.

The invention will be more particularly described with reference to the accompanying diagrammatic flow sheet of an illustrative embodiment of the invention.

In two or more closed reaction chambers $B_1$, $B_2$ connected in series so as to permit gas flow as hereinafter described, I establish a bed of humidified potassium chloride so placed, supported and maintained that the gaseous oxidation products of ammonia from oxidizing chamber A may be passed uniformly therethrough from one extremity of the bed to the other in the first chamber and thence, in like manner, into and through the second. When the conversion from chloride to nitrate (Eqn. 1) is completed in the first chamber, it is discharged and refilled with fresh chloride and the gas flow is reversed so that the first chamber is now the second in the series as is indicated in dotted lines in the diagram.

The rate of reaction between nitrogen oxides and chloride being determined by the concentration of the former and their time of contact (rate of flow), it is obvious that complete conversion occurs first in the zone of entrance of the gas mixture and extends progressively therefrom throughout the bed. Initially, the absorption of the said oxides through reaction is quantitative, ceasing to be so as the zone of complete conversion tends to occupy the entire bed, thereafter the unabsorbed oxides passing into the second chamber for complete absorption.

Instead of employing a plurality of separate chambers, I may obtain countercurrent contact of the nitrogen oxides and potassium chloride in a single chamber. For example, in a closed chamber provided with an appropriate charging and discharging device, I establish a bed of humidified potassium chloride crystals so maintained that the gaseous oxidation products of ammonia may be passed uniformly therethrough in a direction substantially countercurrent to the direction of movement of the said crystals. A rate of gas flow is maintained with respect to the dimensions of the bed of crystals and the movement thereof such that complete reaction occurs and the converted potassium nitrate is discharged as formed. The original proportions of the bed are maintained by the addition thereto of fresh portions of potassium chloride at the same rate as that at which the potassium nitrate is discharged. Thus, the oxides of nitrogen are passed in countercurrent reactive contact with the bed of crystals from bottom to top, for example, with the emission of the gaseous reaction products (NOCl) at the top, while the fresh potassium chloride is added at the top and the solid reaction product ($KNO_3$) is discharged at the bottom.

Or, as another alternative procedure, a saturated solution of potassium chloride may be employed and the ammonia oxidation products bubbled therethrough, with the precipitation of potassium nitrate and the evolution of gaseous reaction products (HCl and/or NOCl), to be utilized as herein described.

The gaseous reaction products (NOCl, with or without HCl, NO or $NO_2$) from the reaction chambers $B_1$, $B_2$ are now led into and through a bed of humidified, granular phosphate rock in conversion chamber $C_1$ in a manner analogous to that described above in connection with reaction chambers $B_1$ and $B_2$, with the obvious substitution of the phosphate rock for potassium chloride, resulting in the production of solid monocalcium phosphate and calcium chloride and of gaseous oxides of nitrogen (Eqn. 2). It will be apparent that $NO_2$ so produced may react, at least in part, with the phosphate rock to form monocalcium phosphate and calcium nitrate (Eqn. 5) as described in my above mentioned application. As an alternative thereto, instead of a solid reaction product (Eqn. 2) to be discharged, a liquid product may be obtained (Eqn. 3) by maintaining a graduated aqueous flow downward through the said bed against an upward flow of reactive gases, to yield a concentrated solution of calcium chloride and phosphoric acid, and this solution may be reacted with a suitable quantity of phosphate rock to produce monocalcium phosphate (Eqn. 4) as described in my above mentioned application. The products thus obtained, consisting principally of solid monocalcium phosphate and calcium chloride, are then heated in furnace $D_1$ as described in the aforementioned patent application by the procedures and to yield the products therein described, including liberation of part of the chloride content as hydrochloric acid (Eqn. 8).

The gases emitted from the phosphate bed, now NO (together with the residual $N_2$, $CO_2$, etc. and any unreacted $NO_2$) are intermixed with air as a source of $O_2$ for the oxidation of the NO to $NO_2$ (Eqn. 5) and are then passed into reactive contact with humidified phosphate rock in conversion chamber $C_2$ for the commercially complete absorption of the $NO_2$, as described in my above mentioned application (Eqns. 6 and 7) and to yield calcium nitrate and monocalcium phosphate or phosphoric acid. In this case also, if the product contains phosphoric acid, it may be converted to monocalcium phosphate by reaction with phosphate rock as above described (Eqn. 4).

The calcium nitrate phosphate product yields, when subjected to heat treatment in furnace $D_2$, a part of its nitrate content as nitric acid, (Eqn. 9) and there is thus provided the means whereby all of the nitrogen entering the system can be recovered and any nitrogen as oxides not absorbed in the first application of the ammonia oxidation products to potassium chloride can be subsequently utilized to yield potassium nitrate or other merchantable products.

The heating of the monocalcium phosphate products obtained from $C_1$ and $C_2$ may be carried out under varying conditions in furnaces $D_1$ and $D_2$, as described in my above mentioned application, to form products of varying degrees of basicity and to effect varying degrees of removal of the respective chloride and nitrate constituents thereof. In general, however, I prefer to conduct these heating operations at such temperature as to convert the phosphate largely or substantially wholly to a form containing calcium and phosphate in substantially the proportion of dicalcium phosphate, when allowance is made for calcium remaining combined with chloride or nitrate respectively. Temperatures in the neighborhood of 150° C. have been found suitable for this purpose.

It will be seen that I have devised a novel method of operation whereby the oxides of nitrogen from ammonia oxidation are quantitatively utilized in the manufacture of potassium nitrate, together with mono- or di-calcium phosphate-nitrate products and nitric acid; and that a novel method of utilizing nitrosyl chloride is disclosed, whereby its chlorine content is applied to the manufacture of mono- or di-calcium phosphate-chloride products and hydrochloric acid, with the separation and quantitative utilization of the nitrogen oxide content of said nitrosyl chloride.

This application is a continuation-in-part of my application Serial No. 5881 filed February 9, 1935, now Patent 2,134,013.

I claim:

1. A method of producing phosphate products which comprises contacting a gas containing nitrosyl chloride as the preponderant acid reactant with phosphate rock in the presence of water to produce a water-soluble reaction product.

2. A method of producing phosphate products which comprises contacting a gas containing nitrosyl chloride as the preponderant acid reactant with phosphate rock in the presence of water to produce a water-soluble reaction product, and thereafter heating the reaction product to drive off at least a portion of the reacted acids and produce an agriculturally available phosphate product.

3. A method of producing phosphate products which comprises contacting a gas containing nitrosyl chloride as the preponderant acid reactant with phosphate rock in the presence of an amount of water to produce a reaction product predominantly in solid form, and thereafter heating the reaction product to drive off at least a portion of the reacted acids and produce an agriculturally available phosphate product.

4. A method of producing phosphate products which comprises contacting a gas containing nitrosyl chloride as the preponderant acid reactant with phosphate rock in the presence of water to produce a reaction product containing a major portion of the chlorine content of the nitrosyl chloride as calcium chloride and also containing phosphate, and thereafter heating said reaction product to drive off at least a portion of the chlorine as hydrochloric acid and produce a second reaction product containing calcium phosphate in agriculturally available form.

5. A method of producing phosphate products which comprises reacting gaseous nitrosyl chloride with phosphate rock in the presence of water to produce a reaction product containing a major portion of the chlorine content of the nitrosyl chloride as calcium chloride and a gaseous product containing nitrogen oxides, adding oxygen to the gaseous product and reacting it with a further portion of phosphate rock to produce a second reaction product containing calcium nitrate.

6. A method of producing phosphate products which comprises reacting gaseous nitrosyl chloride with phosphate rock in the presence of water to produce a reaction product containing a major portion of the chlorine content of the nitrosyl chloride as calcium chloride and a gaseous product containing nitrogen oxides, adding oxygen to the gaseous product and reacting it with a further portion of phosphate rock to produce a second reaction product containing calcium nitrate and heating said first reaction product to drive off at least a portion of the reacted hydrochloric acid.

7. A method of producing phosphate products which comprises reacting gaseous nitrosyl chloride with phosphate rock in the presence of water to produce a reaction product containing a major portion of the chlorine content of the nitrosyl chloride as calcium chloride and a gaseous product containing nitrogen oxides, adding oxygen to the gaseous product and reacting it with a further portion of phosphate rock to produce a second reaction product containing calcium nitrate and heating said second reaction product to drive off at least a portion of the reacted nitric acid.

8. A method of producing phosphate products which comprises reacting gaseous nitrosyl chloride with phosphate rock in the presence of water to produce a reaction product containing a major portion of the chlorine content of the nitrosyl chloride as calcium chloride and a gaseous product containing nitrogen oxides, adding oxygen to the gaseous product and reacting it with a further portion of phosphate rock to produce a second reaction product containing calcium nitrate, heating said first reaction product to drive off at least a portion of the reacted hydrochloric acid and heating said second reaction product to drive off at least a portion of the reacted nitric acid.

JOHN W. TURRENTINE.